United States Patent [19]

Gerson et al.

[11] 4,064,129

[45] Dec. 20, 1977

[54] PROCESS FOR MAKING QUINACRIDONE AND ITS DERIVATIVES

[75] Inventors: Herman Gerson, New York, N.Y.; John Francis Santimauro, Wyckoff; Lawrence Robert Lerner, Livingston, both of N.J.

[73] Assignee: Harmon Colors Corporation, Haledon, N.J.

[21] Appl. No.: 724,150

[22] Filed: Sept. 17, 1976

[51] Int. Cl.² ............................................. C09B 48/00
[52] U.S. Cl. ......................... 260/279 QA; 106/288 Q
[58] Field of Search ............. 260/279 QA; 106/288 Q

[56] References Cited

U.S. PATENT DOCUMENTS

| | | | |
|---|---|---|---|
| 3,261,836 | 7/1966 | Chen | 260/279 QA |
| 3,264,299 | 8/1966 | Thomas et al. | 260/279 QA |
| 3,966,726 | 6/1976 | Toth et al. | 260/249.8 |

FOREIGN PATENT DOCUMENTS 978,091  12/1964  United Kingdom ......... 260/279 QA

Primary Examiner—Donald G. Daus
Assistant Examiner—Diana G. Rivers
Attorney, Agent, or Firm—Plumley and Tyner

[57] ABSTRACT

A process is described for making quinarcridone and its derivatives, useful as organic pigments, wherein a 2,5-diarylaminoterephthalic acid and an acid catalyst are heated in a two phase liquid system, comprising ethylene glycol and an organic liquid which is immiscible with water and ethylene glycol, wherein the ethylene glycol is present in an amount of about 0.25 to 4 parts by weight per part of 2,5-diarylaminoterephthalic acid and the organic liquid is present in an amount of at least about 2 parts by weight per part of ethylene glycol, at a temperature sufficient to remove by-product water from the liquid system by vaporization.

22 Claims, No Drawings

PROCESS FOR MAKING QUINACRIDONE AND ITS DERIVATIVES

BACKGROUND OF THE INVENTION

1. Field of Invention

This invention relates to a process for making quinacridones which are important commercial lightfast pigments and are extensively used in automotive finishes, textile printing and in architectural paints.

2. Description of the Prior Art

A commercially important process for making quinacridones involves the acid catalyzed ring closure of 2,5-diarylaminoterephthalic acids in polyphosphoric acid which is usually a preferred solvent for effecting the ring closure since it functions as both solvent and acid catalyst and is exemplified in U.S. Pat. No. 3,342,823 (Dien), U.S. Pat. No. 3,257,405 (Gerson et al.), U.S. Pat. No. 3,265,699 (Jaffe), and U.S. Pat. No. 3,940,349 (North). However, other solvents such as nitrobenzene can be used with an acid catalyst as disclosed in U.S. Pat. No. 3,020,279 (Woodlock), and still another process known in the prior art is exemplified in British patent Specification No. 978,091 (Sandoz) in which quinacridones are prepared by ring closing a 2,5-diarylaminoterephthalic acid in an organic solvent such as ethylene glycol with the aid of an acid catalyst. However, these prior art methods suffer from the disadvantage of using large quantities of expensive solvents which are difficult and/or hazardous to recover and which tend to create pollution problems.

It is an object of this invention to provide a simple and economical process for making quinacridone and its derivatives using a limited quantity of ethylene glycol solvent in the presence of an easily recoverable organic liquid.

It is also an object of this invention to make unsubstituted gamma quinacridone by a simple and economical process.

A still further object is to prepare solid solutions of quinacridone mixtures by a simple and economical process.

Other objects and advantages of the present invention will appear from the following embodiments and descriptions.

SUMMARY OF THE INVENTION

According to this invention, there is provided a process for making quinacridone and its derivatives, useful as organic pigments, which comprises heating a 2,5-diarylaminoterephthalic acid and an acid catalyst in a two phase liquid system, comprising ethylene glycol and an organic liquid which is immiscible with water and ethylene glycol, wherein the ethylene glycol is present in an amount of about 0.25 to 4 parts by weight per part of 2,5-diarylaminoterephthalic acid and the organic liquid is present in an amount of at least about 2 parts by weight per part of ethylene glycol, at a temperature sufficient to remove by-product water from the liquid system by vaporization. The resulting quinacridone is essentially pure and requires no further purification.

The following equation illustrates the general reaction of this invention:

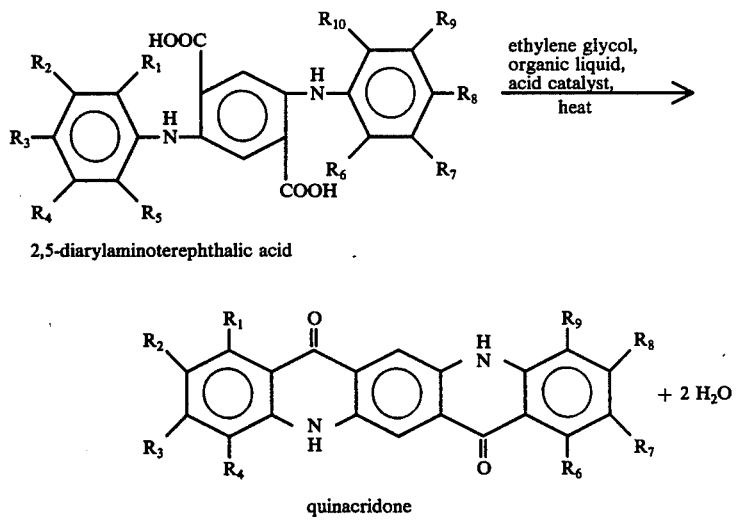

2,5-diarylaminoterephthalic acid quinacridone wherein $R_5$ and $R_{10}$ are H, and $R_1$, $R_2$, $R_3$, $R_4$, $R_6$, $R_7$, $R_8$ and $R_9$ can be the same or different and are selected from the group consisting of H, alkyl, preferably containing from 1 to 4 carbon atoms, halogen such as Cl, Br, I or F, trifluoromethyl, alkoxy, preferably containing from 1 to 4 carbon atoms, carboxy, carboalkoxy, preferably containing from 2 to 5 carbon atoms, sulfonic acid, nitro, amino, alkylamino, preferably containing from 1 to 6 carbon atoms, mercapto, alkylmercapto, preferably containing from 1 to 6 carbon atoms, arylazo, preferably containing from 6 to 18 carbon atoms, and aryl, preferably containing from 6 to 18 carbon atoms, either separately or as a fused ring.

A preferred embodiment of this invention is the process for preparing 2,9-dimethylquinacridone from 2,5-di-p-toluidinoterephthalic acid where $R_3$ and $R_8$ are methyl and $R_1$, $R_2$, $R_4$, $R_5$, $R_6$, $R_7$, $R_9$ and $R_{10}$ are H.

A further preferred embodiment of this invention is the process for preparing 2,9-dichloroquinacridone from 2,5-di-p-chloroanilinoterephthalic acid where $R_3$ and $R_8$ are chloro, and $R_1$, $R_2$, $R_4$, $R_5$, $R_6$, $R_7$, $R_9$ and $R_{10}$ are H.

Another aspect of this invention is a process for making unsubstituted gamma quinacridone wherein 2,5-dianilinoterephthalic acid is heated with an acid catalyst in a two phase liquid system, comprising ethylene glycol and an organic liquid which is immiscible with water and ethylene glycol, wherein the ethylene glycol is present in an amount of about 0.25 to 4 parts by weight per part of 2,5-diarylaminoterephthalic acid and the organic liquid is present in an amount of at least about 2 parts by weight per part of ethylene glycol, in the presence of finely divided unsubstituted quinacridone, at a temperature sufficient to remove by-product water from the liquid system by vaporization.

Still another aspect of this invention is a process for making quinacridone mixtures which are substantially solid solutions (characterized in that the X-ray diffraction pattern thereof is different from the sum of the X-ray diffraction patterns of the component quinacridones), wherein a mixture of 2,5-diarylaminoterephthalic acids and an acid catalyst are heated in a two phase liquid system, comprising ethylene glycol and an organic liquid which is immiscible with water and ethylene glycol, wherein the ethylene glycol is present in an amount of about 0.25 to 4 parts by weight per part of 2,5-diarylaminoterephthalic acid and the organic liquid is present in an amount of at least about 2 parts by weight per part of ethylene glycol, at a temperature sufficient to remove by-product water from the liquid system by vaporization.

DETAILED DESCRIPTION OF THE INVENTION AND THE PREFERRED EMBODIMENTS

This invention relates to a new process of converting 2,5-diarylaminoterephthalic acids to their corresponding quinacridones by an acid catalyzed ring closure in which two moles of water per mole of 2,5-diarylaminoterephthalic acid are formed as by-product.

The advantage of this process is embodied in the use of an organic liquid which is immiscible with water and ethylene glycol and which acts as a diluent for the ethylene glycol in the two phase liquid system and also acts as an aid in removing by-product water as it is formed in the reaction.

The process comprises heating a 2,5-diarylaminoterephthalic acid with an acid catalyst in a two phase liquid system, comprised of ethylene glycol and an organic liquid which is immiscible with water and ethylene glycol, wherein the required amount of ethylene glycol per part by weight of 2,5-diarylaminoterephthalic acid is significantly reduced from about 10 to 20 parts to 1, as used in the prior art (exemplified in British patent Specification No. 978,091), to about 0.25 to 4 parts of ethylene glycol per part of 2,5-diarylaminoterephthalic acid.

This is especially important from a pollution standpoint since reducing the amount of ethylene glycol required in the process thereby reduces the amount that usually is discarded as waste. The two phase liquid system also produces quinacridones in high yield and surprisingly high purity which is in marked contrast to quinacridones which are made from a procedure employing only ethylene glycol as the organic liquid and an acid catalyst, as exemplified in British patent Specification No. 978,091, which suffer from the fact that they contain a significant amount of impurities which are deleterious to color quality and must be purified before commercial use. It is believed that the removal of by-product water during the course of the process of this invention is a major factor in obtaining high yields of quinacridones high purity, as opposed to the quinacridones obtained by the process described in British patent Specification No. 978,091, thereby eliminating the need for purification, a very expensive and difficult operation.

The organic liquid should be immiscible with the ethylene glycol and water throughout the temperature range used in the process of this invention. However, it is well known that solubility between two immiscible liquids generally increases with increasing temperature and that slight solubility between ethylene glycol and the organic liquid or water and the organic liquid may occur. Thus, the term immiscible, as used herein, includes such slight solubility, provided that the solubility does not adversely affect the existence of the two phase liquid system between the ethylene glycol and the organic liquid. The organic liquid should preferably be a nonsolvent for the initial 2,5-diarylaminoterephthalic acid used and the corresponding quinacridone obtained.

The organic liquid generally has a boiling point of about 80° to 200° C., preferably about 110° to 145° C. It is preferred to recover the organic liquid in order to minimize possible pollution problems. In such case, the organic liquid used should possess a density which is sufficiently different from that of ethylene glycol and water to allow recovery and recycle of the organic liquid back to the reaction mixture.

Typical of the organic liquids which are immiscible with water and ethylene glycol are the aromatic hydrocarbons, halogenated aromatic hydrocarbons and halogenated aliphatic hydrocarbons. Preferred among the aromatic hydrocarbons are benzene, toluene and all of the isomers of xylene, preferred among the halogenated aromatic hydrocarbons are chlorobenzene, orthodichlorobenzene and trichlorobenzene, and the preferred liquid among the halogenated aliphatic hydrocarbons is perchloroethylene, because of its non-flammability, nontoxicity, ease of recovery and low cost. The organic liquid is employed in at least about 2 parts by weight per part of ethylene glycol, and preferably in the range of about 2 to about 40 parts per part of ethylene glycol, the more preferred range being from about 8 to about 25 parts organic liquid per part of ethylene glycol.

It has been found that ethylene glycol is suprisingly very effective in promoting the ring closure of 2,5-diarylaminoterephthalic acid in the present invention. Various other glycols have been unsuccessfully tried in the invention such as ethylene glycol monomethylether, 1,2-propylene glycol, 1,3-propylene glycol and glycerine. It is possible that ethylene glycol enters into the mechanism of the ring closure reaction of the 2,5-diarylaminoterephthalic acid by forming some type of an intermediate glycolic ester, however, the mechanism has not been established.

In general, the amount of ethylene glycol used per part of 2,5-diarylaminoterephthalic acid by weight is generally about 0.25 to 4 parts per part of 2,5-diarylaminoterephthalic acid, a preferred range being about 0.5 to 4 parts of ethylene glycol per part of 2,5-diarylaminoterephthalic acid, the more preferred range being about 0.5 to 2 parts of ethylene glycol per part of 2,5-diarylaminoterephthalic acid. The reduced amount of ethylene glycol required in the process of the instant invention represents a significant economic advantage over the prior art in which larger quantities are required.

The acid catalysts that may be used include, but are not limited to, the mono- or di-sulfonic acids of benzene, toluene, xylene, paradichlorobenzene, naphthalene, nitrobenzene and chloroparaxylene. Also, perchloric acid and the alkylsulfonic acids such as methanesulfonic acid are useful. The arylsulfonic acids which are preferred can be added directly or they may be prepared in situ by using stoichiometric amounts of Sulfan (a registered trademark of Allied Chemical Corporation) stabilized liquid sulfur trioxide, and the corresponding aromatic moiety. The use of sulfuric acid by itself as a catalyst has a tendency to form impure quinacridone products and thus the aryl- or alkylsulfonic acids are preferred. Generally, the acid catalyst is used in a range of about 0.1 to about 4 parts per part of 2,5-diarylaminoterephthalic acid, the preferred range being from about 0.2 to 1.5 parts per part of 2,5-diarylaminoterephthalic acid.

The process generally comprises heating a mixture of the organic liquid, the acid catalyst, ethylene glycol and 2,5-diarylaminoterephthalic acid and then stirring and heating to a temperature sufficient to remove by-product water from the liquid system by evaporation and maintaining that temperature with agitation, generally over a time period of about 8 to 24 hours, preferably about 8 to 16 hours.

After the heat cycle period has been completed the resulting quinacridone is isolated from the reaction mixture by filtration or the solvent removed by distillation, followed by treatment of the resulting quinacridone with hot dilute alkali to remove small amounts of any unreacted 2,5-diarylaminoterephthalic acid, then filtered, washed alkali free and dried.

The process can alternatively be conducted in a pressure vessel with the proviso that by-product water is removed during the course of the reaction and the modifications made with respect to choice of pressure, time of heating and organic liquid will be obvious to one skilled in the art.

The temperature sufficient to remove by-product water from the liquid system by evaporation is the reflux temperature of the liquid system containing water, ethylene glycol and the organic liquid. The term reflux temperature as used herein only refers to that temperature at which liquid vapor from the mixture of water and the two phase liquid system begins to form and is condensed by external cooling, and the term does not imply that the entire vapor after being condensed is returned completely to the reaction mixture. The initial vapor that is formed must contain water and probably contains ethylene glycol and the organic liquid. The vapor may contain binary or ternary constant boiling mixtures or azeotropes or simply be a mixture of water vapor and vapor of the two phase liquid system, or vapors of water and ethylene glycol or just water vapor. Usually, the vapor consists of water, ethylene glycol and the organic liquid.

The reflux temperature of the liquid system is primarily a function of the individual boiling points of the three liquids in the system, i.e. organic liquid, ethylene glycol and water, and their relative proportions. Water is continuously being formed as a by-product in the reaction mixture and moderates the reflux temperature by lowering the temperature of reflux of the liquid mixture. It is preferred to select an organic liquid and relative proportions in the liquid mixture to achieve a reflux temperature in the range of about 70° to 200° C. In the use of perchloroethylene as the organic liquid, a reflux temperature in the range of 116° to 122° C. is preferably achieved.

The yields of quinacridones obtained by the process are generally within the range of 90 to 98% of theory and purities obtained are generally within the range of 90 to 100% as compared to a commercially pure quinacridone standard measured spectrophotometrically in sulfuric acid. The purity of the obtained quinacridones is within commercial acceptance requiring no purification.

When 2,5-dianilinoterephthalic acid is employed, the alpha, beta, gamma and other known crystal forms of unsubstituted quinacridone which are well known in the art can be obtained. The usual product is a mixture of the beta and gamma forms, but occasionally a pure alpha, beta or pure gamma crystal form, as evidenced by X-ray diffraction data, is obtained.

However, the pure gamma crystal form can be reproducibly prepared by the convenient technique of adding a small amount of finely divided unsubstituted quinacridone to the reaction mixture before bringing the liquid system to the reflux temperature. The finely divided unsubstituted quinacridone presumably acts as a "seed" in the reaction in directing the crystal phase of the product and surprisingly, the crystal form of the "seed" used is immaterial on the course of the reaction, e.g., the alpha, beta or gamma forms of "seed" can be used and the resultant effect in each case is to direct the formed quinacridone from the ring closure of 2,5-dianilinoterephthalic acid to the gamma form of unsubstituted quinacridone.

The amount of finely divided unsubstituted quinacridone that is preferably used is generally at least about 0.001 and preferably about 0.01 to about 0.1 part by weight per part of 2,5-dianilinoterephthalic acid. Larger amounts can be used with equivalent results. It is preferred to use an aqueous pulp, e.g. the wet filtered solid of freshly prepared or freshly milled material, of the unsubstituted quinacridone which is then heated to reflux in the reaction mixture to remove the water in the system. In this manner a finely divided form of unsubstituted quinacridone is obtained. However, a dry powder which finely ground may also be successfully used.

The process of this invention can be utilized to prepare unsubstituted quinacridones as well as substituted quinacridones. Representative examples of unsubstituted quinacridones which can be prepared by the process of this invention are: alpha-quinacridone, beta-quinacridone, gamma-quinacridone, and mixtures thereof. Preferred embodiments of the unsubstituted quinacridones produced by the process of this invention are beta and gamma quinacridones.

Representative examples of substituted quinacridones which can be prepared by the process of this invention are 2,9-dimethyl-, 4,11-dimethyl-, 1,8-dimethyl-, 3,10-dimethyl-, 3,8-dimethyl-, 2,9-dichloro-, 4,11-dichloro-, 1,8-dichloro-, 3,10-dichloro-, 3,8-dichloro-, 2,9-dicarboxy-, 2,9-dicarboethoxy-, 2,9-dicarbomethoxy-, 2,9-difluoro-, 2,9-di-trifluoromethyl- and 2,9-dimethoxyquinacridone. Preferred embodiments are the processes yielding 2,9-dimethyl-, 2,9-dichloro-, 4,11-dichloro-, 4,11-dimethylquinacridone.

Examples of substituted quinacridones obtainable by the invention are not limited only to those which are symmetrically substituted but include unsymmetrical, substituted quinacridones as well, e.g., 1, 2, 3- or 4-chloro, -fluoro, -trifluoromethyl, -methyl, -carboxy, -carboethoxy, and -carbomethoxy quinacridones and the corresponding 1, 3- or 2,4-disubstituted derivatives prepared from diarylaminoterephthalic acids containing two dissimilar arylamino groups. Also included are unsymmetrically substituted quinacridones made from 2,5-diarylaminoterephthalic acids in which there is a different substituent on each arylamino ring, e.g., chloro and methyl such that 2-chloro-9-methyl-quinacridone is produced.

The instant invention is also suitable for the synthesis of quinacridone solid solutions. A solid solution of quinacridones is defined in U.S. Pat. No. 3,160,510 (Ehrich) as exhibiting an X-ray diffraction pattern which is not the sum of its individual components but instead exhibits a uniquely different pattern. An example of a solid solution that is made by this method is a 1:1 by weight solid solution of unsubstituted quinacridone and 2,9-dimethylquinacridone in which the solid solution exhibits a different X-ray diffraction pattern from the sum of its components.

Representative examples of solid solutions that can be prepared by the process of this invention are 4,11-dichloroquinacridone/quinacridone, 2,9-dimethylquinacridone/quinacridone 2,9-dichloroquinacridone/quinacridone and 4,11-dimethylquinacridone/quinacridone, which are all binary types. Tertiary types of solid solutions can also be prepared as for example 4,11-dichloroquinacridone/2,9-dichloroquinacridone/quinacridone. Preferred solid solutions are those that are binary and composed of two quinacridones selected from the group consisting of quinacridone, 4,11-dichloroquinacridone, 2,9-dichloroquinacridone and 2,9-dimethylquinacridone.

The following examples illustrate the utility of the process of this invention for the synthesis of quinacridones both substituted and unsubstituted and also for quinacridone solid solutions. Such examples should not be construed to be limitations on the scope or spirit of the instant invention. Parts indicated in the examples are parts by weight.

EXAMPLE 1

Into a flask equipped with an agitator, returnable trap, thermometer and electric heating jacket, are charged 2400 parts perchloroethylene and 84 parts para-toluenesulfonic acid monohydrate. The contents are refluxed at 116°-121° C. until all water in the system is removed (about 7.8 parts), then cooled to 90° C. and 132 parts ethylene glycol, 132 parts 2,5-dianilinoterephthalic acid are added and the reaction contents heated to 116° C. over 2 hours. The contents are stirred and heated at 116°-117° C. for a total of 16 hours. During the heating cycle, the water formed in the reaction is constantly being distilled out along with ethylene glycol and perchloroethylene. The water-ethylene glycol layer is removed while the perchloroethylene portion is returned to the reaction. The reaction mixture is filtered and the resulting solid is reslurried in 2000 parts water and 120 parts 50% sodium hydroxide solution, boiled for 3 hours, filtered, and the solid washed alkali free and dried at 180° F. The yield is 94.4% of theory of a red solid comprising a mixture of gamma quinacridone and a minor amount of beta quinacridone as evidenced by its X-ray diffraction pattern.

EXAMPLE 2

Using the equipment of Example 1, into a flask equipped with an agitator, returnable trap, thermometer and electric heating jacket, are charged 2400 parts perchloroethylene, 90 parts 2,4-dimethylbenzenesulfonic acid and 9.3 parts quinacridone aqueous pulp (dry content 29%). The contents are refluxed at 116°-121° C. until all water in the system is removed, and 2,5-dianilinoterephthalic acid and 132 parts ethylene glycol are charged and the mixture heated at a reflux temperature of 116°-117° C. for 6 hours. After 6 hours, 33 parts of ethylene glycol is added, and the reflux is continued at a temperature of 116°-117° C. for a total of 16 hours. During the heating cycle, the water formed in the reaction is constantly being distilled out with ethylene glycol and perchloroethylene. The water-ethylene glycol layer is removed while the perchloroethylene is returned to the reaction. The reaction mixture is cooled, filtered, and the resulting solid is reslurried and boiled in 2000 parts water containing 80 parts 50% sodium hydroxide solution. The solid is filtered, washed alkali free and dried at 180° F. The yield is 95% of theory of a red solid comprising gamma-quinacridone as evidenced by its X-ray diffraction pattern.

EXAMPLE 3

Using the equipment of Example 1, 2400 parts perchloroethylene, 84 parts para-toluenesulfonic acid monohydrate and 16.7 parts aqueous quinacridone pulp (dry content 16.1%) are charged and the mixture refluxed at 116°-121° C. until all water in the system is removed, whereupon the temperature reaches 122° C. Then, 99 parts ethylene glycol, 132 parts 2,5-dianilinoterephthalic acid and 37.5 parts benzene are then charged at 90° C. and heated to a reflux temperature of 116°-121° C. in 2 hours. After 6 hours, 33 parts ethylene glycol are added and the reflux is continued at a temperature of 121°-122° C. for a total of 16 hours. The reaction mixture is cooled to 80° C., filtered, and the resulting solid is reslurried and boiled in 5000 parts water and 300 parts of 50% NaOH solution 3 hours. The solid is filtered, washed alkali free, and dried at 180° F. The yield is 97.4% of theory of a red solid comprising gamma-quinacridone as evidenced by its X-ray diffraction pattern.

EXAMPLE 4

Using the equipment of Example 1, 2400 parts perchloroethylene, 77.6 parts benzenesulfonic acid (90%) and 16.7 parts aqueous quinacridone pulp (dry content 16.1%) are charged and the mixture is refluxed at 116°-121° C. until all water in the system is removed. The reaction mixture is cooled to 90° C. and 99 parts ethylene glycol and 132 parts 2,5-dianilinoterephthalic acid are added and the mixture heated to a reflux temperature of 116°-121° C. in 2 hours. After 6 hours of refluxing, 33 parts of ethylene glycol is added and the reflux is continued at a temperature of 121°-122° C. for a total of 16 hours. The procedure is continued and completed as described in Example 1. The yield is 98.8% of theory of a red solid comprising gamma-quinacridone as evidenced by its X-ray diffraction pattern.

EXAMPLE 5

The procedure is followed as described in Example 4, but 100 parts of 2-naphthalenesulfonic acid are used in place of the benzenesulfonic acid. The yield is 99.2% of theory of a red solid comprising gamma-quinacridone as evidenced by its X-ray diffraction pattern.

EXAMPLE 6

The procedure is followed as described in Example 4 but 42.4 parts methanesulfonic acid are used in place of benzenesulfonic acid. The yield is 91.9% of theory of a red solid comprising gamma-quinacridone as evidence by its X-ray diffraction pattern.

EXAMPLE 7

Using the equipment of Example 1, 2400 parts perchloroethylene and 68.3 parts chloro-p-xylene (0.48 mol) are charged. Then 35.4 parts Sulfan (0.44 mol) are added dropwise over 15 minutes and the reaction temperature held at 118°-120° C. for 1 hour. The reaction mixture is cooled to 90° C. and 132 parts ethylene glycol and 132 parts 2,5-dianilinoterephthalic acid are added and the reaction heated over 2 hours to a reflux temperature of 121°-122° C. After 6 hours at reflux, 40 parts of ethylene glycol are added and reflux is continued at 121°-122° C. for 16 hours. The procedure is continued and completed as described in Example 1. The yield is 98.1% of theory of a bluish-red solid comprising a mixture of beta and gamma quinacridones as evidenced by its X-ray diffraction pattern.

EXAMPLE 8

Using the equipment of Example 1, 2400 parts perchloroethylene, 16.7 parts aqueous quinacridone pulp (dry content 16%) and 72.1 parts p-toluenesulfonic acid are charged and the mixture refluxed at 116°-122° C. to remove all the water from the system. The reaction mixture is cooled to 90° C. and 132 parts ethylene glycol, 132 parts 2,5-dianilinoterephthalic acid and 6 parts methanesulfonic acid are added and the mixture heated to a reflux temperature of 121°-122° C. over 2 hours. After 6 hours at reflux, 40 parts ethylene glycol are added and the reflux is continued at a temperature of 121°-122° C. for a total of 16 hours. The procedure is continued and completed as described in Example 2. The yield is 95.5% of theory of a red solid comprising gamma-quinacridone as evidenced by its X-ray diffraction pattern.

EXAMPLE 9

Using the equipment of Example 1, 1920 parts perchloroethylene, 144 parts p-toluenesulfonic acid and 13.3 parts quinacridone aqueous pulp (dry content 24.6%) are charged and the mixture refluxed at a temperature of 116°-121° C. to remove all the water from the system. The reaction mixture is cooled to 90° C., and 113 parts ethylene glycol and 226 parts 2,5-dianilinoterephthalic acid are added and the mixture refluxed at a temperature of 121°-122° C. for 16 hours. Every 2 hours the same volume of ethylene glycol is added to the reaction mixture as collects in the condensation trap through vaporization. The total ethylene glycol added during the heating cycle is 67.4 parts. The procedure is continued and completed as in Example 1. The yield is 99.5% of theory of a red solid comprising gamma-quinacridone as evidenced by its X-ray diffraction pattern.

EXAMPLE 10

Using the equipment of Example 1, 2400 parts perchloroethylene and 84 parts p-toluenesulfonic acid monohydrate are heated to a reflux temperature of 116°-121° C. to remove water from the reaction mixture. 132 parts ethylene glycol and 132 parts 2,5-dianilinoterephthalic acid are added and the mixture heated at a reflux temperature of 118° C. for a total of 16 hours. The procedure is continued and completed as described in Example 1. The yield is 96% of theory of a violet solid comprising beta quinacridone as evidenced by its X-ray diffraction pattern.

EXAMPLE 11

Using the equipment of Example 1, 2400 parts xylene and 84 parts p-toluenesulfonic acid monohydrate are charged and the mixture refluxed at a temperature of 133°-136° C. to remove all the water from the sytem. The reaction mixture is cooled to 90° C. and 132 parts ethylene glycol and 132 parts 2,5-dianilinoterephthalic acid are added and the mixture heated to a reflux temperature of 133°-136° C. The refluxing is continued for a total of 16 hours and the procedure is completed as in Example 1. The yield is 95.7% of theory of a reddish-violet solid comprising a mixture of beta and gamma quinacridones as evidenced by its X-ray diffraction pattern.

EXAMPLE 12

The procedure is followed as described in Example 11 but benzene is used in place of xylene and the reflux is carried out and maintained at 80° C. for 48 hours. The yield is 38.8% of theory of a red solid comprising alpha-quinacridone as evidenced by its X-ray diffraction pattern.

EXAMPLE 13

Using the equipment of Example 1, 1280 parts perchloroethylene, 88 parts ethylene glycol, 56 parts p-toluenesulfonic acid monohydrate and 88 parts 2,5-dianilinoterephthalic acid are charged. The flask is swept out with nitrogen gas and the contents heated to 120° C. At 120° C. a reflux condenser is attached to allow slow stream of nitrogen to pass above the surface of the liquid in the flask to remove water of reaction. After 16 hours at the reflux temperature of 120° C., the procedure is completed as described in Example 1. The yield is 95% of theory of a violet solid comprising a mixture of beta and gamma quinacridones as evidenced by its X-ray diffraction pattern.

EXAMPLE 14

Using the equipment of Example 1, 280 parts o-dichlorobenzene, 40 parts p-toluenesulfonic acid monohydrate, 20 parts 2,5-di(p-chloroanilino)terephthalic acid and 20 parts ethylene glycol are charged. The contents are heated to a reflux temperature of about 155° C. and after 6 hours refluxing at 155° C. 10 parts ethylene glycol are added and the reflux is continued for a total of 16 hours at 155° C. The procedure is completed as described in Example 1. The yield is 89.2% of theory of 2,9-dichloroquinacridone.

EXAMPLE 15

Using the equipment of Example 1, 320 parts perchloroethylene and 40 parts p-toluenesulfonic acid monohydrate are charged and the mixture refluxed at 116°-121° C. to remove all the water from the system. The reaction mixture is cooled to 90° C. and then 20 parts ethylene glycol and 20 parts 2,5-di(p-chloroanilino)terephthalic acid are added and the mixture heated to a reflux temperature of 118°-122° C. After 6 hours of reflux, 20 parts of ethylene glycol are added and the refluxing is continued for an additional 10 hours. The procedure is completed as described in Example 2. The yield is 89.2% of theory of 2,9-dichloroquinacridone.

EXAMPLE 16

Using the equipment of Example 1, 2400 parts perchloroethylene and 84 parts p-toluenesulfonic acid monohydrate are charged and the mixture is refluxed at 116°-121° C. until all water in the system has been removed. The reaction mixture is cooled to 90° C. and then 132 parts ethylene glycol and 132 parts 2,5-di(p-toluidion) terephthalic acid are added and the mixture heated to a reflux temperature of 120°-122° C. in 2 hours. After 7 hours of refluxing 40 parts ethylene glycol are added and the reflux continued at a temperature of 121°-122° C. for an additional 9 hours. The procedure is completed as described in Example 1. The yield is 94.6% of theory of 2,9-dimethylquinacridone.

EXAMPLE 17

Using the equipment of Example 1, 2400 parts perchloroethylene and 84 parts p-toluenesulfonic acid monohydrate are charged and the mixture is heated to a reflux temperature of 116°-121° C. and refluxed until all water in the system has been removed. The reaction mixture is cooled to 90° C. and 66 parts ethylene glycol and 132 parts 2,5-di(p-toluidino)terephthalic acid are added and the mixture heated to a reflux temperature of 121°-122° C. in 2 hours. After 7 hours of refluxing 20 parts ethylene glycol is added and the reflux is continued at 121°-122° C. for an additional 9 hours. The procedure is completed as described in Example 1. The yield is 93.4% of theory of 2,9-dimethylquinacridone.

EXAMPLE 18

Using the equipment of Example 1, 1920 parts perchloroethylene, 28.6 parts aqueous quinacridone pulp (dry content 16.6%) are charged, and the mixture refluxed at 116°-121° C. until all water in the system is removed. The mixture is cooled to 90° C. and 144 parts of the crude mixed isomers of toluenesulfonic acid, 170 parts of ethylene glycol and 226 parts of 2,5-dianilinoterephthalic acid are added and the mixture heated to a reflux temperature of 116°-121° C. in 2 hours. After 6 hours of refluxing 51 parts of ethylene glycol are added and the reflux is continued at a temperature of 121°-122° C. for 16 hours. The reaction mixture is cooled and the procedure is completed as described in Example 1. The yield is 97.3% of theory of a red solid comprising gamma-quinacridone as evidenced by its X-ray diffraction pattern.

EXAMPLE 19

Using the equipment of Example 1, 250 parts o-dichlorobenzene, 22 parts ethylene glycol, 22 parts 2,5-dianilinoterephthalic acid and 5 parts 75% perchloric acid are charged and the mixture is heated to 155° C to initiate refluxing. Refluxing is continued at 155° C. for 16 hours, and the procedure is completed as described in Example 1. The yield is 94.2% of theory of a bluish-red solid comprising gamma and beta quinacridones as evidenced by its X-ray diffraction pattern.

EXAMPLE 20

Using the equipment of Example 1, 320 parts perchloroethylene and 14 parts para-toluenesulfonic acid monohydrate (99% purity) are charged and the mixture is refluxed at 116°-121° C. to remove the water in the system. The mixture is cooled to 90° C. and 10 parts 2,5-dianilinoterephthalic acid, 10 parts 2,5-di-p-toluidinoterephthalic acid and 22 parts ethylene glycol are added and the mixture is refluxed at 118° C. for 5 hours. After 5 hours of refluxing, 8 parts ethylene glycol are added and the reflux is continued at 118° to 122° C. for a total of 16 hours. The mixture is cooled, filtered, and the resulting solid reslurried in hot dilute caustic, filtered, washed alkali free and dried at 180° F. The yield is 92% of theory of a maroon colored solid comprising a solid solution of quinacridone and 2.9-dimethylquinacridone. This product exhibits a different X-ray diffraction pattern than either the quinacridone, or the 2,9-dimethylquinacridone or the sum of the two.

EXAMPLE 21

Using the equipment and quantities of materials as described in Example 1, the reaction contents are refluxed at 111°-115° C for 20 hours during which the liquid phase is continually condensed and returned to the reaction mixture without removal of by-product water.

The yield is 26.5% of theory of a violet solid comprising beta quinacridone as evidenced by its X-ray diffraction pattern.

We claim:

1. A process for making quinacridone and its derivatives which comprises heating a 2,5-diarylaminoterephthalic acid and an acid catalyst in a two phase liquid system, comprising ethylene glycol and an organic liquid which is immiscible with water and ethylene glycol, wherein the acid catalyst is selected from the group consisting of the mono-or di-sulfonic acids of benzene, toluene, xylene, paradichlorobenzene, naphthalene, nitrobenzene and chloroparaxylene, perchloric acid and methanesulfonic acid; ethylene glycol is present in an amount of about 0.25 to 4 parts by weight per part of 2,5-diaryl-aminoterephthalic acid and the organic liquid present in an amount of at least about 2 parts by weight per part of ethylene glycol, at a temperature sufficient to remove by-product water from the liquid system by vaporization.

2. A process for making a quinacridone of the following formula:

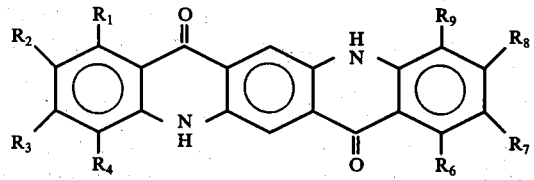

which comprises heating a 2,5-diarylaminoterephthalic acid of the following formula:

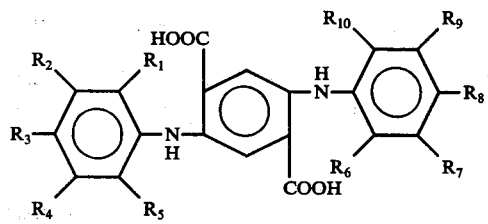

wherein $R_1$, $R_2$, $R_3$, $R_4$, $R_6$, $R_7$, $R_8$, $R_9$ can be the same or different and are selected from the group consisting H, alkyl, halogen, trifluoromethyl, alkoxy, carboxy, carboalkoxy, sulfonic acid, nitro, amino, alkylamino, mercapto, alkylmercapto, arylazo and aryl; and an acid catalyst in a two phase liquid system, comprising ethylene glycol and an organic liquid which is immiscible with water and ethylene glycol, wherein the acid catalyst is selected from the group consisting of the monoand di-sulfonic acids of benzene, toluene, xylene, paradichlorobenzene, naphthalene, nitrobenzene and chloroparaxylene, perchloric acid and methanesulfonic acid; the ethylene glycol is present in an amount of about 0.25 to 4 parts by weight per part of 2,5-diarylaminoterephthalic acid and the organic liquid is present in an amount of at least about 2 parts by weight per part of ethylene glycol, at a temperature sufficient to remove by-product water from the liquid system by vaporization.

3. The process of claim 2 wherein the organic liquid is present in an amount of about 2 to about 40 parts by weight per part of ethylene glycol.

4. The process of claim 2 wherein the organic liquid is perchloroethylene.

5. The process of claim 2 wherein the organic liquid is selected from the group consisting of o-dichlorobenzene, trichlorobenzene, chlorobenzene, benzene, toluene, ortho, meta and paraxylene or mixtures thereof.

6. The process of claim 2 wherein the 2,5-diarylaminoterephthalic acid is 2,5-di-p-toluidinoterephthalic acid and the product is 2,9-dimethylquinacridone.

7. The process of claim 2 wherein the 2,5-diarylaminoterephthalic acid is 2,5-di-p-chloroanilinoterephthalic acid and the product is 2,9-dichloroquinacridone.

8. The process of claim 2 wherein the 2,5-diarylaminoterephthalic acid contains two identical arylamino groups selected from the group consisting of p-fluoroanilino, p-trifluoromethylanilino, p-carboxyanilino, p-carbomethoxyanilino, p-carboethoxyanilino, m-chloroanilino, o-chloroanilino, m-methylanilino, o-methylanilino and anilino and the product is a symmetrically substituted quinacridone.

9. The process of claim 2 wherein the 2,5-diarylaminoterephthalic acid contains two dissimilar arylamino groups selected from the group consisting of p-fluoroanilino, p-trifluoromethylanilino, p-carboxyanilino, p-carbomethoxyanilino, p-carboxyethoxyanilino, m-chloroanilino, o-chloroanilino, m-methylanilino, o-methylanilino and anilino and the resulting product is an unsymmetrically substituted quinacridone.

10. A process for making unsubstituted gamma quinacridone which comprises heating 2,5-dianilioterephthalic acid and an acid catalyst in a two phase liquid system, comprising ethylene glycol and an organic liquid which is immiscible with water and ethylene glycol, wherein the acid catalyst is selected from the group consisting of the mono- or di-sulfonic acids of benzene toluene, xylene, paradichlorobenzene, naphthalene, nitrobenzene and chloroparaxylene, perchloric acid and methanesulfonic acid, the ethylene glycol is present in an amount of about 0.25 to 4 parts by weight per part of 2,5-dianilinoterephthalic acid and the organic liquid is present in an amount of at least about 2 parts by weight per part of ethylene glycol, in the presence of finely divided unsubstitued quinacridone, at a temperature sufficient to remove by-product water from the liquid system by vaporization.

11. The process of claim 10 wherein the amount of finely divided unsubstituted quinacridone is at least about 0.001 part per part of 2,5-dianilinoterephthalic acid.

12. The process of claim 10 wherein the organic liquid is present in an amount of about 2 to about 40 parts by weight per part of ethylene glycol.

13. The process of claim 12 wherein the organic liquid is perchloroethylene.

14. A process for making substantially solid solutions of quinacridone mixtures being characterized in that the X-ray diffraction pattern thereof is different from the sum of the X-ray diffraction patterns of the component quinacridones, which comprises heating a mixture of 2,5-diarylaminoterephthalic acids and an acid catalyst in a two phase liquid system, comprising ethylene glycol and an organic liquid which is immiscible with water and ethylene glycol, wherein the acid catalyst is selected from the group consisting of the mono- or di-sulfonic acids of benzene, toluene, xylene, paradichlorobenzene, naphthalene, nitrobenzene and chloroparaxylene, perchloric acid and methanesulfonic acid; the ethylene glycol is present in an amount of about 0.25 to 4 parts by weight per part of the 2,5-diarylaminoterephthalic acid mixture and the organic liquid is present in an amount of at least about 2 parts by weight per part of ethylene glycol, at a temperature sufficient to remove by-product water from the liquid system by vaporization.

15. The process of claim 14 wherein the organic liquid is present in an amount of about 2 to about 40 parts by weight per part of ethylene glycol.

16. The process of claim 14 wherein the organic liquid is perchloroethylene.

17. The process of claim 14 wherein the mixture of 2,5-diarylaminoterephthalic acids comprises 2,5-dianilinoterephthalic acid and at least one 2,5-diarylaminoterephthalic acid selected from the group consisting of 2,5-di-p-chloroanilinoterephthalic acid, 2,5-di-p-toluidinoterephthalic acid, 2,5-di-o-chloroanilinoterephthalic acid and 2,5-di-o-toluidinoterephthalic acid.

18. The process of claim 14 wherein the mixture of 2,5-diarylaminoterephthalic acids comprises 2,5-dianilinoterephthalic acid and 2,5-di-p-toluidinoterephthalic acid.

19. The process of claim 1 wherein the by-product water is continuously removed along with ethylene glycol and said organic liquid, and said organic liquid is returned to the system after its separation from water and ethylene glycol.

20. The process of claim 2 wherein the by-product water is continuously removed along with ethylene glycol and said organic liquid, and said organic liquid is returned to the system after its separation from water and ethylene glycol.

21. The process of claim 10 wherein the by-product water is continuously removed along with ethylene glycol and said organic liquid, and said organic liquid is returned to the system after its separation from water and ethylene glycol.

22. The process of claim 14 wherein the by-product water is continuously removed along with ethylene glycol and said organic liquid, and said organic liquid is returned to the system after its separation from water and ethylene glycol.

* * * * *